July 27, 1954  G. P. TICE  2,684,942
SERVICE HEADER FOR WATER SOFTENING INSTALLATIONS
Filed July 18, 1950  2 Sheets-Sheet 2
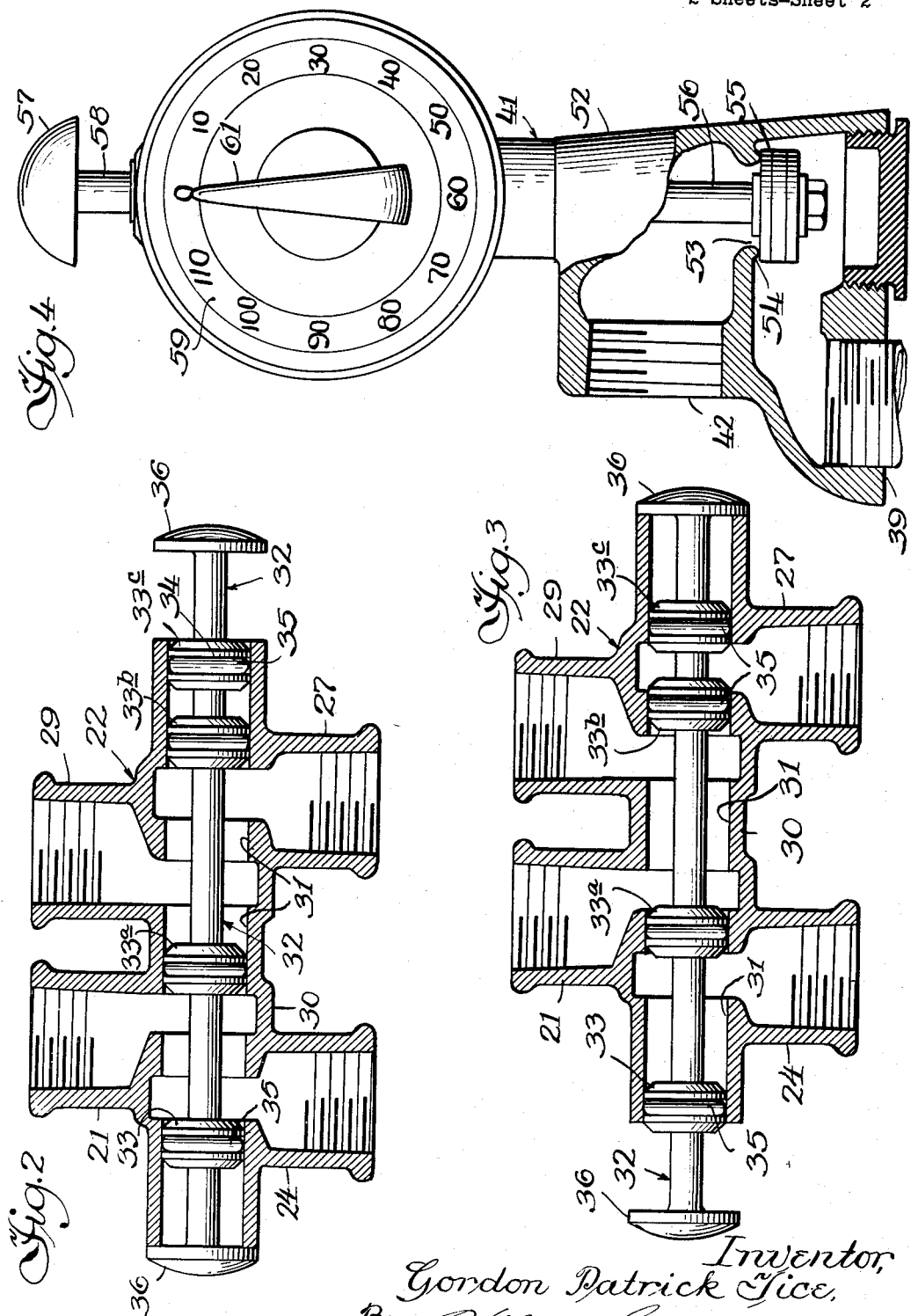

Patented July 27, 1954

2,684,942

UNITED STATES PATENT OFFICE 2,684,942

SERVICE HEADER FOR WATER SOFTENING INSTALLATIONS

Gordon Patrick Tice, Northbrook, Ill., assignor to Culligan, Inc., Northbrook, Ill., a corporation of Delaware Application July 18, 1950, Serial No. 174,487

2 Claims. (Cl. 210—24)

1

The present invention comprehends a novel type service header including a plurality of service tanks adapted for commercial and industrial establishments, apartment buildings, institutions and other large users of softened or treated water. As the amount of softened water there required is relatively large, the present invention is designed to accommodate multiple installations of service tanks or units in such number and manner as to fully and effectively satisfy the needs of such large users, the amount of softened water required between regenerations determining the number of softener tanks or units installed.

As these tanks or units in large installations require relatively frequent regeneration and if permanently installed and regeneration is limited to that that may be accomplished where installed, they gradually lose their efficiency and capacity due to the lack of sufficient volume of water or facilities available at the installation to thoroughly backwash and reclassify the minerals or softening materials employed in the tank. This gradual drop in capacity and efficiency necessitates more frequent regeneration in situ on the part of the user and this necessarily increases the time and labor required in an endeavor to maintain the maximum effectiveness possible under these conditions.

In order to obviate these difficulties and the resultant decrease in efficiency, the present invention contemplates the periodic removal of the individual service tanks or units and their replacement by the service operator of other similar service tanks or units which the operator has professionally serviced and in which he has completely regenerated the minerals or softening materials contained therein, whereby the user is assured of the continued optimum efficiency of the equipment. The tanks or units removed and replaced by the operator are then professionally and completely serviced and made ready for reinstallation wherever required.

It is, therefore, an important object of the present invention to provide a novel water softening installation or system for commercial users in which multiple softener tanks are connected in parallel during normal softening operation, and when regeneration is required these tanks are quickly connected for series regeneration.

Another object of the present invention is the provision of a novel water softening system employing multiple water softening tanks and a novel valve arrangement whereby the tanks are connected in parallel for normal water softening operation and in series for regeneration in situ.

A further object of the present invention is the provision of a novel service header for commercial establishments, industrial plants, apartment buildings, institutions and other large users of water in which the user is assured of large quantities of soft water at a minimum cost. As the present novel installation is equipped to handle any desired number of softener tanks or units, the amount of water required between regenerations determines the number of tanks or units to be employed with the header.

Another object of the present invention is the provision of a novel assembly or installation of a service header for a plurality of tanks equipped with manually actuated or push-button controlled valves, a brine maker, check valves, timing mechanism for timing the brine, and a brine and rinse flow rate controller, all so constructed, combined, arranged and related as to permit successive parallel softening and backwashing of the tanks or units, and series brining and rinsing, after which the installation is automatically returned to its normal operation of filtering and softening the hard water to be treated.

A still further object of the present invention is to provide a novel water softening and regeneration system for a multiple softener installation in which the user can repeatedly regenerate the softener units in situ when they become exhausted, and periodically, depending upon the turbidity of the water supply, removing and replacing the exhausted softener units by similar softener units that have been professionally regenerated and serviced by the service operator at his establishment, after which the removed units are taken by the operator to his place of business and there professionally serviced and regenerated where he has all the facilities required for maximum efficiency in backwashing, regeneration and servicing of the removed units.

The present invention further comprehends the provision of a novel service header assembly with multiple softener units in which the connections may be easily and quickly altered to accommodate more or less units, depending upon the water requirements.

Another important object of the present invention is the provision of a novel means for and manner of quickly connecting a multiplicity of softener units in parallel for softening and backwashing and in series for regeneration and rinsing, and including a timer mechanism which automatically brines, rinses and shuts off when the steps of regeneration in situ have been completed.

The periodic removal and replacement of the multiple service tanks or units assures continuous maximum effectiveness and capacity, and as the novel installation permits the addition or the removal of tanks or units, if the user has seasonal variations in water demands, service units can be quickly added or removed, as desired or required. As in the operation of this novel installation the user pays on the basis of the number of tanks or units employed, his cost varies in accordance with his water requirements.

Water softening tanks of the removable and interchangeable service type as herein employed are preferably of the type disclosed in the Culligan Patents No. 2,252,065, granted August 12, 1941, and No. 2,265,268, granted December 9, 1941. These tanks are provided with quick detachable connecting means permitting each tank to be readily installed and periodically removed by the service operator and replaced by another service tank, the replaced tank being removed by the service operator to his place of business or establishment for regeneration and servicing.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Fig. 2 is a view in vertical cross-section through one of the push button or manually actuated control valves and showing the position occupied by the valve plunger for normal softening and backwashing operation.

Fig. 3 is a cross-sectional view similar to Fig. 2 but with the valve plunger moved to the position it occupies during the brining and rinsing operations when regenerating the minerals or materials in the tank.

Fig. 4 is a view, part in front elevation and part in vertical cross-section, of the timer and the valve actuated thereby for automatically controlling the brining and rinsing operations.

Figure 1:
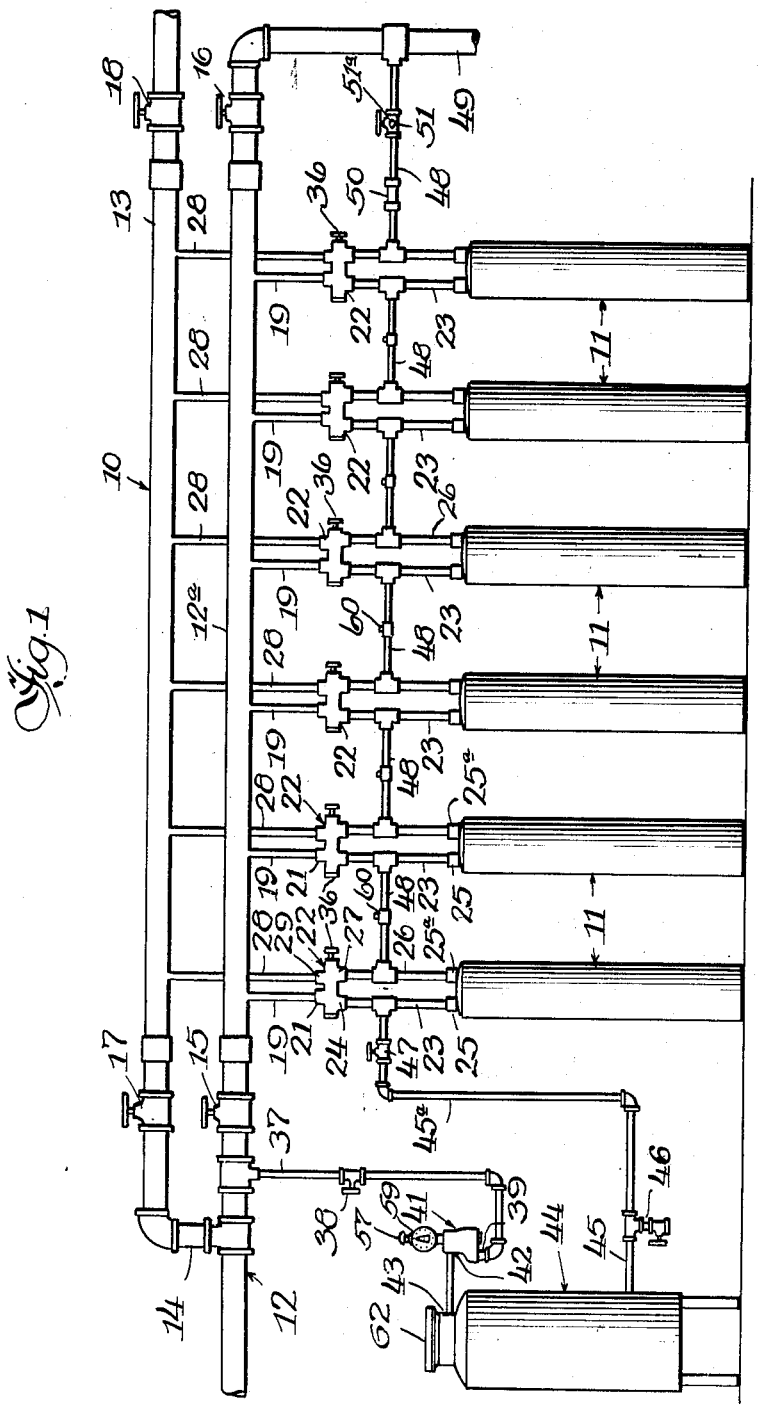
Figure 1 is a diagrammatic view of a commercial service header assembly with multiple tanks connected for parallel softening and backwashing operations and for series brining and rinsing operations.

Referring more particularly to the drawings and to the novel illustrative embodiment therein selected for showing a full and complete disclosure of the present invention, the novel commercial service header 10 is shown as supplying relatively large users of filtered soft water such as industrial plants, commercial establishments, apartment buildings, institutions and the like. To supply these large users, the present invention comprehends the provision of multiple service tanks or units 11 for softening, filtering and conditioning the water, the tanks or units being connected to the header by a relatively large inlet pipe or conduit 12 through which the hard or untreated water enters, and to a relatively large outlet or service pipe or conduit 13 for receiving and discharging the filtered soft water after it has passed through the filtering and softening materials in the multiple tanks or softening units 11.

In order to make the hard or untreated water available in the outlet or service pipe 13 during the period when minerals or materials in the tanks or units are being regenerated, the invention comprehends the provision of a by-pass 14 for the hard water into this service line during the short period required for regeneration in situ. The inlet pipe 12 for the entering hard water is provided with a gate valve 15 located forwardly of any connection to the service tanks or units 11 and a gate valve 16 rearwardly of any connection to these tanks or units, while the outlet or service pipe 13 is provided with similarly located gate valves 17 and 18 forwardly and rearwardly of the service tanks or units, respectively.

The inlet pipe section 12$^a$ for the entering water between the gate valves 15 and 16 connects to each of the service tanks or units 11 by a depending section of pipe or conduit 19 connected to a port 21 of a control valve 22, and to a depending section of pipe or conduit 23 connected at one end to a port 24 from the underside of the valve 22 and at its other end connects to the inlet manifold of each tank 11 by a quick, detachable coupling or connector 25 preferably similar to the detachable connectors or couplings disclosed in the Culligan Patent No. 2,265,268.

In a manner reverse to that above described with respect to the intake passage of the hard water downwardly into each tank or unit during normal operation in which the entering hard water is filtered and rendered soft by passage into and through the filtering and softening tanks or units 11, the filtered soft water from each tank passes upwardly through an outlet manifold in the tank, through a quick detachable coupling 25$^a$ similar to the coupling 25 and connected to one end of a pipe section or conduit 26 with the other end of this pipe section conduit attached to a depending port 27 on the control valve 22. Another section of pipe or conduit 28 is connected at its lower or one end to a port 29 on the control valve and at its upper or other end to the outlet or service line 13 for the filtered soft water.

As shown more clearly in Figs. 2 and 3, each manual control valve 22 includes a valve body or housing 30 having the pair of upwardly opening and spaced ports 21 and 29 and the depending and downwardly opening spaced ports 24 and 27 for the passage of water, and a longitudinal bore 31 therethrough providing a cylindrical passage in which is slidably mounted a valve plunger 32. The slidable valve plunger is provided with suitably spaced heads or lands 33, 33$^a$, 33$^b$ and 33$^c$ all substantially conforming to but of slightly less diameter than internal diameter of the longitudinal and cylindrical bore or internal circumference 31 of the housing. Each head or land 33 to 33$^c$ inclusive is provided with an annular, outwardly opening channel 34 adapted to receive a resilient O-ring or sealing element 35 for sealing contact with the cylindrical valve seating surfaces on the interior of the bore or internal circumference of the housing.

The opposite ends of the valve plunger 32 are each provided with a knob or push button 36 to permit the plunger to be moved manually to either of the positions shown in Figs. 2 or 3. In the position shown in Fig. 2 and with the valve plunger 32 moved to the right, passage of water is permitted through the then connecting ports 21 and 24 as well as through the then connecting ports 27 and 29. This is the position occupied by the valve plunger during the normal filtering and softening operation as well as during backwashing prior to regeneration, as will be later more fully explained. In the position shown in Fig. 3 with the valve plunger moved to the left, water is by-passed from the port 21 to the then connecting port 29, while the ports 24 and 27 are closed through the valve body.

Connected to the inlet pipe or conduit 12 forwardly of the gate valve 15 is a pipe section 37 connected through a valve 38 to the inlet port 39 of a timer valve assembly 41 for timing and controlling the brine and rinse water. This timer valve is provided with an outlet port 42 connected to the top or inlet end 43 of a salt pot or brine tank 44. A pipe or conduit 45 leads from the base of the brine tank, through a drain valve 46, pipe section 45ª and a valve 47 to the pipe section 23 of the first or adjacent softener tank 11. Pipe sections or conduits 48 connect the softener tanks in series between the outlet pipe section 26 to each succeeding inlet pipe section 23 and with the last pipe section or conduit 48 connected to the drain 49 through a rate flow controller 50 and a valve 51.

The timer valve assembly 41 is shown in detail in Fig. 4 and comprises a valve housing 52 having the inlet port 39 and outlet port 42 connected through an opening or passage 53 encompassed by a valve seat 54. To control the flow through this passage 53 and the outlet port 42, a sealing valve member 55 comprising a resilient sealing washer or element is mounted or carried on the lower end of a vertically movable valve stem 56. This valve stem is spring-biased toward its raised, closed position, but may be manually lowered by pressure applied to a knob or push button 57 on the upper end of a valve plunger 58.

A timer or timing mechanism on the housing 52 includes a dial 59 calibrated in minutes or other suitable designations of time, and an indicator or pointer 61 to permit the user to set the timer for any contemplated or required period of time, whereupon the timer automatically releases the valve plunger 58 and the spring-biased valve stem 56 is raised and elevates its valve member 55 to its normal closed position against the valve seat 54 as shown in Fig. 4. The details of this timer valve assembly may be similar to those disclosed in the co-pending Hintz application Serial No. 96,010, filed May 28, 1949.

During normal softening operation water enters the inlet pipe 12 and with the valve 38 controlling the flow to the timer valve 41 and the brine tank or salt pot 44, as well as the valve 47 for filling the salt pot 44, the valve 51 for checking the softener tanks 11 after brining and rinsing, and valve 17 and valve 16 all closed, this entering water flows through pipe section 12ª and into the parallel tanks 11 through the pipe sections 19, connecting ports 21 and 24 of the control valves 22, pipe sections 23 and inlet connectors or couplings 25 of these tanks.

The entering water after being treated or conditioned by passing through the bed of minerals or softening materials in the tanks 11, passes upwardly through the couplings or connectors 25ª, pipe sections 26, connecting ports 27 and 29 of the control valves 22 (see Fig. 2), and then upwardly through the pipe section 28 from where the softened water enters the outlet or service pipe 13 for carrying off the softened water for ultimate use. Thus it will be evident that the header assembly accomplishes parallel softening when the valves 15 and 18 are open and the valves 16, 17, 38, 47 and 51 are closed.

At any time during the day while the header assembly is functioning to deliver soft water, the user may remove the lid 62 of the salt pot or brine tank 44 and open the valve 46 controlling the flow from the base of this salt pot or brine tank. After allowing sufficient time for this tank to drain, the valve 46 is closed and the user adds sufficient salt to this tank or salt pot to adequately regenerate the number of tanks 11 connected to the header. The valve 47 is then opened and water from the pipe section 23 in the first tank 11 is allowed to slowly flow into the salt pot or brine tank 44 until the latter is filled to approximately the rim of the top opening. This accomplished, the user is prepared to regenerate in situ when required.

When regeneration is necessary, this can be quickly and easily accomplished by the manipulation of the valves in the following manner. Valve 15 in the inlet pipe 12 and valve 18 in the service line are closed and valves 17 and 16 are opened, whereby water entering the pipe 12 thereupon flows through the by-pass 14 into the service pipe 13, but as the valve 18 is closed this water flows downwardly through the parallel arranged pipe sections 28, passes downwardly through the connecting ports 29 and 27 of the control valves 22 (see Fig. 2), through the pipe sections 26 and what is normally the outlet connectors or couplings 25ª, then downwardly through the minerals or materials in the tanks 11, upwardly and outwardly through what is normally the inlet couplings or connectors 25, pipe sections 23, through the connecting ports 24 and 21 of the control valves 22, and upwardly through the pipe sections 19 and into the section 12ª of the inlet pipe. As the valve 15 is closed and the valve 16 is open, this water flows outwardly through the valve 16 to the drain 49. This backwashing operation is for the purpose of removing excess turbidity in the water and loosening the minerals or zeolite in the bed of each tank. In this operation the water flows through the tanks 11, through their connections and through the control valves 22 in the reverse direction from the direction of flow during the normal softening operation, but with the control valves 22 maintained in the position shown in Fig. 2. If desired, the filling of the salt pot may be done at this time or accomplished as previously described.

After backwashing has been accomplished which normally requires approximately five minutes or until the water runs clear at the drain 49, the valves 16 and 17 are closed and the valves 15 and 18 are opened. The plunger 32 of each control valve 22 is then moved or pushed to the left to the position shown in Fig. 3 in which water is by-passed or diverted from each port 21 to its port 29, and the brine and rinse timer valve 41 is set for a desired period and its knob 57 is depressed. Valves 38, 47 and 51 are then opened, whereby water flows from the inlet pipe 12 downwardly through the pipe section 37, through valve 38, through the inlet port 39 of the brine and rinse timer valve 41 and out through the passage 53 (see Fig. 4) which has been opened upon depressing the knob 57, through the outlet port 42 and into the brine tank. The brine from the tank 44 is forced out through the pipe sections 45 and 45ª, through the valve 47, downwardly through the pipe section 23 and into the initial tank 11, through the minerals in this tank, upwardly and outwardly through the pipe section 26 of this initial softener tank 11.

As the control valves 22 are in the position shown in Fig. 3, the brine cannot pass through the initial control valve nor through the succeeding ones, but must pass into and through the successive tanks 11 in series through their connecting pipes 48. Each pipe 48 is preferably provided with a check valve 60 whereby to permit checking of the individual tanks 11. The rate flow controller 50 in the pipe 48 leading from the last tank 11 automatically regulates the flow rate of the brine and rinse, and in the present embodiment excellent results have been secured by regulating this brine and rinse flow rate at approximately one and one-half gallons per minute.

The pipe 48 from the last tank 11 discharges the brine and rinse water through the open valve 51 to drain. This salting and subsequent rinsing to remove all salt continues for the prescribed period, whereupon the timer valve 41 automatically closes and re-establishes normal softening operation as set forth below.

The valve 51 is preferably provided with a pet cock 51ª to permit checking or testing of the discharged water for softness. In the event the discharged water does not satisfy the requirement as to softness, the timer may be set for several more minutes. When the desired degree of softness has been established, the valves 38, 47 and 51 are closed and the valves 22 are moved to the position of Fig. 2 for normal softening operation.

By retaining the valves 15 and 18 open during regeneration, the user is assured a supply of water even though it has not been treated. This is due to the fact that water entering pipe sections 19 is by-passed or diverted from the port 21 to the then connecting port 29 (see Fig. 3) of each control valve 22, and the by-passed water flows upwardly through the pipe sections 28 into the service pipe 13.

This regeneration in situ may be accomplished as frequently as required, but to obviate any appreciable drop in capacity and efficiency it is contemplated that the service tanks or units 11 be periodically removed and replaced by the service operator with tanks that have been professionally serviced, whereby the user is assured of maximum efficiency without interruption.

Having thus disclosed the invention, I claim:

1. In combination, a header assembly and regeneration mechanism for commercial and industrial establishments, apartment buildings, institutions and other large users of filtered soft water, a plurality of portable softener tanks each containing a bed of material for treating the delivered hard water and provided with an inlet and an outlet, said header assembly including a common inlet conduit and a common outlet and service conduit, plural pipes depending from the common inlet and outlet conduits with a pipe connecting the inlet and another the outlet of each tank to the inlet and outlet conduits of the header assembly, a valve for each tank bridging each pair of pipes of said tank and located between said tank and the inlet and outlet conduits, a pipe connecting the outlet pipe of one tank to the inlet pipe of an adjacent tank between its valve and the tank, a brine tank, means for timing the brining and rinsing operations during regeneration, said valve having a valve body provided with multiple ports connected to the inlet and outlet conduits and to the inlet and outlet of the tank and a movable plunger for controlling the passage of water through said ports, said plunger in one position connecting the ports to the inlet and outlet pipes for the passage of water from the inlet and outlet conduits to the tank for parallel softening and backwashing and in another position disconnecting the ports for the passage of water from the inlet conduit to the tank and from the tank to the outlet conduit and connecting the tanks in series through the pipe connecting the outlet pipe of one tank to the inlet pipe of the adjacent tank for series brining and rinsing.

2. In combination, a header assembly and regeneration mechanism for commercial and industrial establishments, apartment buildings, institutions and other large users of filtered soft water, a plurality of portable and removable softener tanks containing a bed of material for treating the delivered untreated water and each having an inlet and an outlet, said header assembly including a common inlet conduit and a common outlet conduit each of a size to supply water to the plurality of softener tanks for the treating and softening of the raw water supply and for the regenerating of the treating material including the steps of backwashing, brining and rinsing, plural pipes depending from the common inlet and outlet conduits with a pipe connecting the inlet and another the outlet of each tank to the inlet and outlet conduits of the header assembly, a valve for each tank bridging each pair of pipes of said tank and located between said tank and the inlet and outlet conduits, a pipe connecting the outlet pipe of one tank to the inlet pipe of an adjacent tank between its valve and the tank, a brine tank, means for timing the brining and rinsing operations during regeneration, said valve having a valve body provided with multiple ports connected to the inlet and outlet conduits and to the inlet and outlet of the tank and a movable plunger for controlling the passage of water through said ports, said plunger in one position connecting the ports to the inlet and outlet pipes for the passage of water from the inlet and outlet conduits to the tank for parallel softening and backwashing and in another position disconnecting the ports for the passage of water from the inlet conduit to the tank and from the tank to the outlet conduit whereby the tanks are connected in series through the pipe connecting the outlet pipe of one tank to the inlet pipe of the adjacent tank for series brining and rinsing, and simultaneously connecting the ports from the inlet conduit to the outlet conduit for supplying to the latter untreated water during brining and rinsing.

References Cited in the file of this patent

UNITED STATES PATENTS

| Number | Name | Date |
|---|---|---|
| 1,696,396 | Trewhitt et al. | Dec. 25, 1928 |
| 1,763,784 | Hodkinson | June 17, 1930 |
| 2,042,749 | Van Eweyk | June 2, 1936 |
| 2,046,265 | Hewetson | June 30, 1936 |
| 2,252,065 | Culligan | Aug. 12, 1941 |
| 2,315,223 | Riche | Mar. 30, 1943 |
| 2,458,115 | Swenson | Jan. 4, 1949 |
| 2,506,711 | Evans | May 9, 1950 |